E. B. SAVAGE.
Gun-Stock.
No. {999, 32,003}
Patented Apr. 9, 1861.
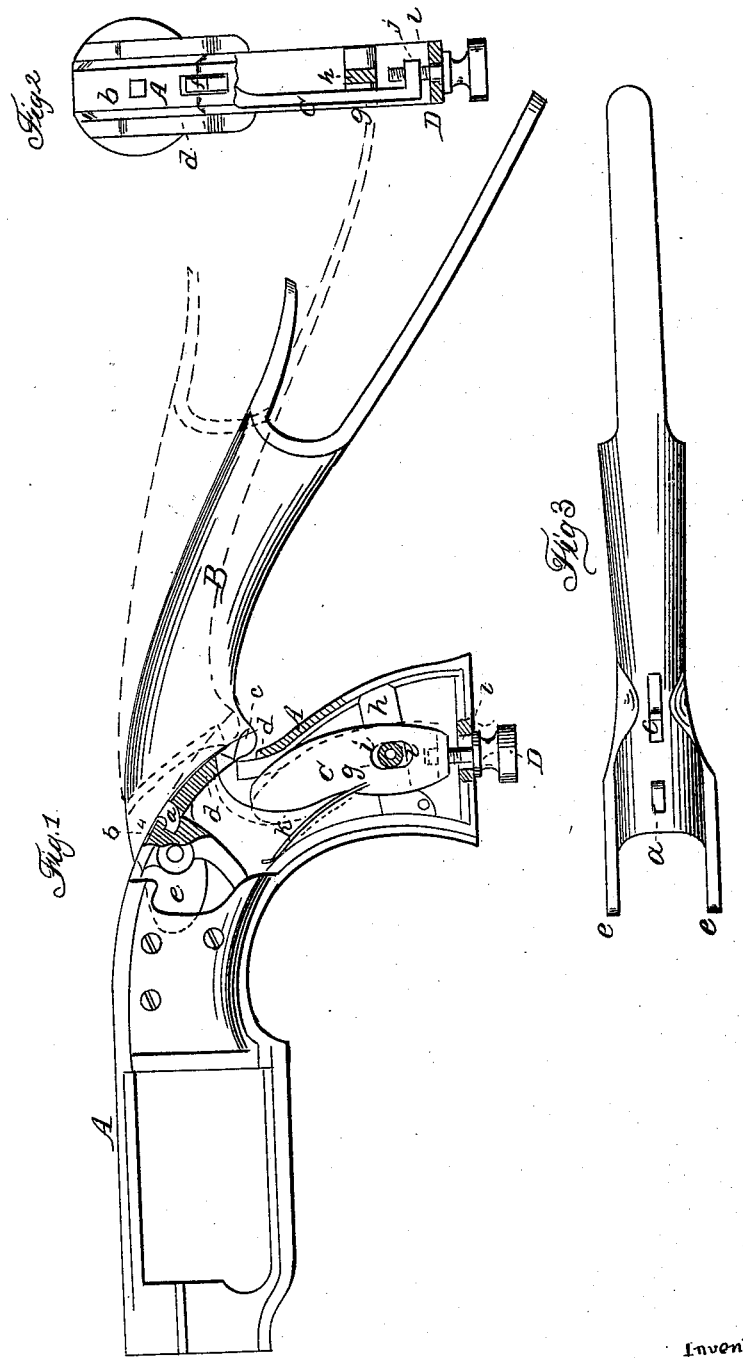

UNITED STATES PATENT OFFICE.

EDWARD B. SAVAGE, OF CROMWELL, CONNECTICUT.

IMPROVED MODE OF ATTACHING GUN-STOCKS TO PISTOLS.

Specification forming part of Letters Patent No. 32,003, dated April 9, 1861.

*To all whom it may concern:*

Be it known that I, EDWARD B. SAVAGE, of Cromwell, in the county of Middlesex and State of Connecticut, have invented a new and Improved Mode of Attaching Gun-Stocks to Pistols; and I do hereby declare that the following is a full, clear, and exact description of the same, reference being had to the accompanying drawings, forming part of this specification, in which—

Figure 1 is a side view, partly in section, of the lock-frame of a pistol and the neck-piece of a gun-stock illustrating my invention. Fig. 2 is a rear view of the lock-frame of the pistol, partly in section. Fig. 3 is an under side view of the neck-piece of the gun-stock.

Similar letters of reference indicate corresponding parts in the several figures.

My invention consists in an improved mode of applying and operating a clamping-dog arranged within the lock-frame of the pistol, in combination with suitable holding devices on the neck-piece of the stock and in or on the lock-frame, whereby a very firm attachment of the gun-stock is made, but facility for detaching it is provided.

To enable others skilled in the art to make and use my invention, I will proceed to describe its construction and operation.

A is the pistol lock-frame, of ordinary construction.

B is the neck of the gun-stock, made wholly or partly of malleable iron or other metal, to fit up against the upper part of the back of the lock-frame, with a hook-like projection, $a$, to enter a mortise, $b$, in the rear of the lock-frame and a beveled projection, $c$, to enter a mortise, $d$, in the lock-frame, and with two cheek-pieces, $e\ e$, projecting forward, so that they will stand one on each side of the lock-frame. The upper part of the mortise $b$ is made of such form that it presents a hook-like downward projection, 4, to lock into the hook $a$ of the neck-piece, as shown in Fig. 1. The length of mortise $d$ is much longer than the depth of the projection $c$, in order to admit the passage of the hook $f$ of the clamping-dog C, whose arrangement constitutes the principal feature of my invention. The clamping-dog C is constructed and arranged to work as a lever upon a fixed fulcrum, $g$, composed of a boss formed on a brace, $h$, within the lock-frame. The hole $i$ in the said dog, which receives the said fulcrum, is elongated, as shown in Fig. 1, to permit a longitudinal or directly upward and downward movement of the said dog, as well as its lever movement. The upper part of the said dog has formed upon it the hook $f$, before mentioned, said hook having a backward direction, and having its inner or under side beveled to correspond with the bevel of the projection $c$ of the neck-piece, and the lower part of the said dog is bent at a right angle to the principal portion of it, as shown at $j$ in Fig. 2, and tapped to receive a screw, D, which passes through a slot, $l$, in the butt of the lock-frame, and which is provided outside of the lock-frame with a head large enough to enable it to be conveniently turned by the hand. This screw may be considered as a part of the same lever with the dog C. In front of the said dog there is applied within the lock-frame a spring, $k$, which presses back the upper part of the dog, and tends to press the hook $f$ over the projection $c$ of the neck-piece.

To enable the gun-stock to be attached to the pistol, the screw D is screwed down low enough for its head to allow the dog C to move up high enough for its hook $f$ to pass over the projection $c$ on the neck-piece B, when the said projection is inserted in the mortise $d$ of the lock-frame. The pistol is then held in the left hand and the gun-stock in the right, and the hook $a$ is inserted in the mortise $b$, as shown in Fig. 1 by the representation of the neck-piece in red outline, and the lock-frame in black, and the projection $c$ pressed against the hook $f$ till it forces the upper part of the dog C forward, as shown in red outline in Fig. 1, far enough to slip under the point of the hook $f$, when the upper part of the dog is thrown back by the spring $k$ over the projection $c$. The screw D is then screwed up, and by its head bearing under the butt of the lock-frame is caused to draw down the dog C longitudinally till the pressure of its hook $f$ upon the projection $c$ draws the neck-piece tightly against the lock-frame, as shown in black outline in Fig. 1, and makes a rigid connection between the two, the cheek-pieces $e\ e$ aiding in stiffening the connection in a lateral direction.

When it is desired to detach the gun-stock, the screw D is screwed down far enough to let the dog C rise high enough for its hook $f$ to pass over the projection c, and pressure is applied to the screw-head D, to draw back the lower part of the dog, and so throw the hook f forward off the said projection, as shown by the representation of the dog in red outline in Fig. 1, when the gun-stock is liberated, and can be taken away from the pistol by drawing the hook a out of the mortise b.

Instead of the hook a and mortise b, the cheek-pieces e e may be made to enter between or hook under pins or lugs projecting from the sides of the lock-frame, and such pins or lugs, with the cheek-pieces, will constitute the full equivalent of the mortise b and hook a. This mode of attaching the gun-stock to the pistol, while it is very secure and very convenient, does not make the weapon awkward either when used as a pistol or gun.

The projecting head of the screw D, so far from being an incumbrance, is rather a convenience to the pistol, as it forms a bearing for the little finger.

What I claim as my invention, and desire to secure by Letters Patent, is—

The lever-like and longitudinally-moving hooked clamping-dog C and its set-screw D, applied in connection with the lock-frame of a pistol, to operate in combination with suitable locking devices on the neck-piece of the stock, substantially as and for the purpose herein specified.

EDWARD B. SAVAGE.

Witnesses:
JAS. A. WHEELOCK,
W. A. B. WHEELOCK.